(12) United States Patent
Lemaire et al.

(10) Patent No.: US 8,460,406 B2
(45) Date of Patent: Jun. 11, 2013

(54) PROCESS FOR PREPARING A FEED CONTAINING BIOMASS INTENDED FOR SUBSEQUENT GASIFICATION

(75) Inventors: Eric Lemaire, Anse (FR); Nicolas Boudet, Chaponost (FR)

(73) Assignee: IFP Energies Nouvelles, Rueil Malmaison Cedex (FR)

( * ) Notice: Subject to any disclaimer, the term of this patent is extended or adjusted under 35 U.S.C. 154(b) by 1063 days.

(21) Appl. No.: 11/878,624

(22) Filed: Jul. 25, 2007

(65) Prior Publication Data

US 2008/0022595 A1 Jan. 31, 2008

(30) Foreign Application Priority Data

Jul. 31, 2006 (FR) .................................. 06 07049

(51) Int. Cl.
*C10L 8/00* (2006.01)
*C10L 5/44* (2006.01)

(52) U.S. Cl.
USPC ............................................. 44/605; 585/242

(58) Field of Classification Search
USPC ................ 44/605; 585/242, 926; 48/209.211, 48/197 FM, 209, 211
See application file for complete search history.

(56) References Cited

U.S. PATENT DOCUMENTS

| | | | | |
|---|---|---|---|---|
| 3,913,761 A | * | 10/1975 | Proner et al. | 198/579 |
| 3,950,267 A | * | 4/1976 | Arakawa et al. | 502/422 |
| 4,266,083 A | * | 5/1981 | Huang | 585/240 |
| 4,597,772 A | * | 7/1986 | Coffman | 48/111 |
| 4,787,917 A | * | 11/1988 | Leclerc de Bussy | 44/606 |
| 4,954,620 A | * | 9/1990 | Bourgeois | 536/56 |
| 6,316,378 B1 | * | 11/2001 | Giebelhausen et al. | 502/10 |
| 7,087,171 B2 | | 8/2006 | Kang et al. | |
| 2003/0221363 A1 | | 12/2003 | Thomas | |
| 2007/0044381 A1 | * | 3/2007 | Holle et al. | 48/197 FM |
| 2007/0051043 A1 | * | 3/2007 | Schingnitz et al. | 48/210 |
| 2007/0094929 A1 | * | 5/2007 | Kang et al. | 48/111 |

FOREIGN PATENT DOCUMENTS

| | | |
|---|---|---|
| CH | 228 877 | 9/1943 |
| GB | 944 282 | 12/1963 |
| WO | 86/06930 | 12/1986 |
| WO | WO 0172403 A1 * | 10/2001 |

OTHER PUBLICATIONS

More Efficient Biomass Gasification via Torrefaction Prin, Ptasinski, Janssen Energy 31 (2006) 3458-3470 (online Apr. 7, 2006).*
Torrefaction for Biomass Upgrading (Bergman and Kiel) 14th European Baiomass Conference in Paris France (Oct. 17-21, 2005).*

* cited by examiner

*Primary Examiner* — Pamela H Weiss
(74) *Attorney, Agent, or Firm* — Millen, White, Zelano & Branigan, P.C.

(57) ABSTRACT

The process of the invention describes a set of steps for preparing a solid lignocellulosic biomass type feed, alone or mixed with a liquid hydrocarbon phase with a view to supplying a unit for gasification of said feed. The various steps include drying, torrefaction, milling and constituting a suspension of particles of biomass in a hydrocarbon cut.

16 Claims, 1 Drawing Sheet

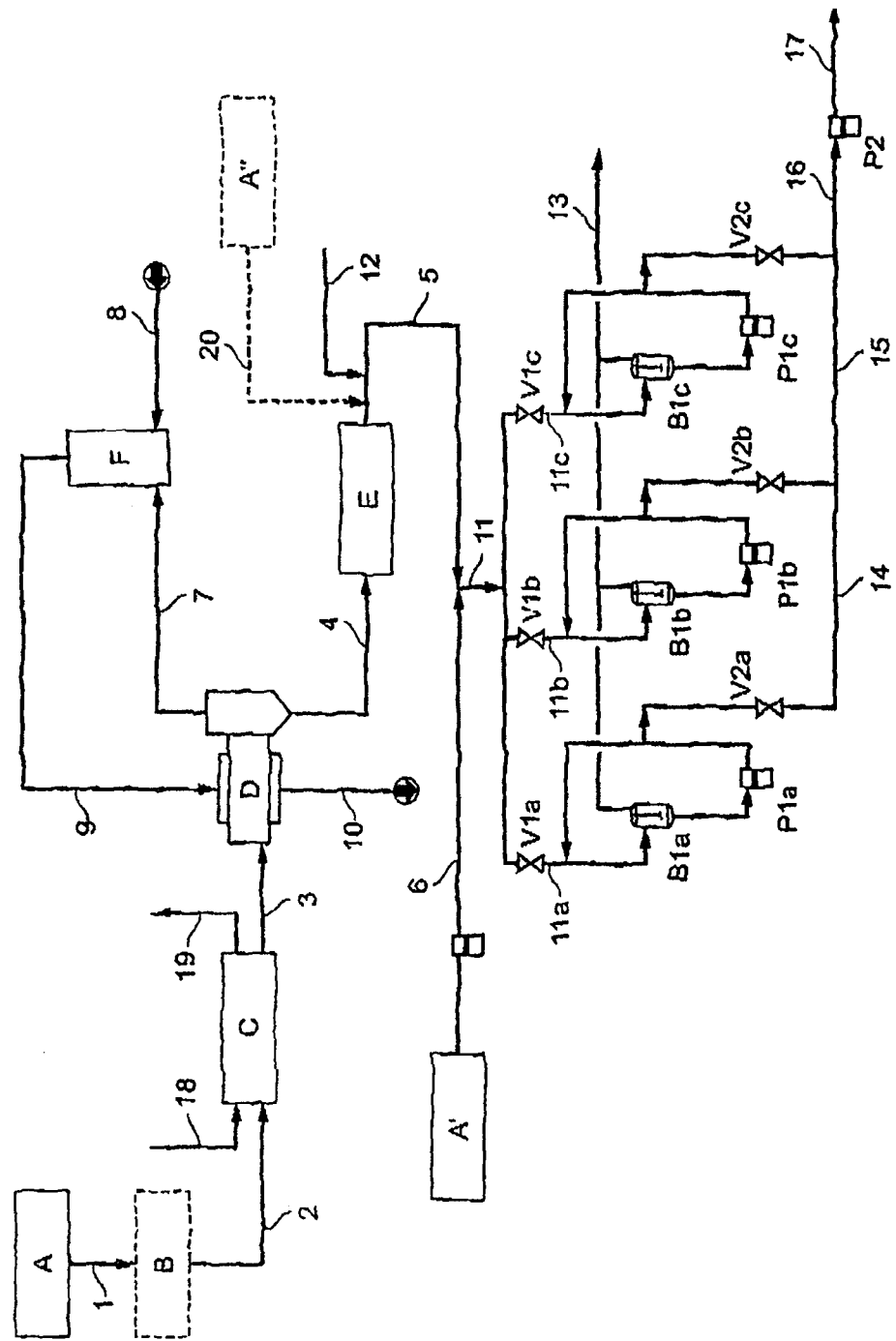

PROCESS FOR PREPARING A FEED CONTAINING BIOMASS INTENDED FOR SUBSEQUENT GASIFICATION

FIELD OF THE INVENTION

The present invention relates to a process for preparing a feed containing fibrous lignocellulosic material, alone or mixed with a hydrocarbon feed to supply a gasification unit. The gasification unit produces a gas essentially containing carbon monoxide and hydrogen, known to the skilled person as synthesis gas (or syngas). The synthesis gas can then recompose a set of hydrocarbon cuts, in particular a gasoline cut and a gas oil cut, using the Fischer-Tropsch process. Synthesis gas may also be used as a vector in the production of energy, or as a starting material for the production of bases for chemistry and petrochemistry.

The present invention is not linked to a particular use of synthesis gas, but one of the important applications of the present invention is in the production line for synthesized hydrocarbons, in particular gasolines and gas oil, starting from a material constituted at least in part by biomass, more precisely lignocellulosic type biomass one example of which is wood chips. Straw or sugar cane trash or other type of ligneous residues may also be cited.

In the remainder of the text, as a typical example of a lignocellulosic feed we shall use wood chips resulting from prior shredding. The shredding step does not fall within the scope of the present invention, but may if needed be added upstream.

Said wood chips are generally delivered in the form of particles a few centimeters in size and may contain up to 40% of water.

The present invention can optimize conditioning of the starting material with a view to its subsequent treatment in a gasification unit, more particularly an entrained bed gasification unit which requires a relatively well graded particle size at the inlet.

said conditioning comprises size reduction to a range of sizes which are suitable for treatment in an entrained bed gasification unit, and also the constitution of a mixture of said feed with a hydrocarbon cut to constitute a suspension of lignocellulosic biomass particles dispersed in said hydrocarbon cut; said suspension of fine solid particles in a liquid is also sometimes termed a "slurry". For the purposes of simplification, the term "suspension" will be used in the remainder of the text.

In addition to solid biomass particles, the suspension formed may also include other solid particles of appropriate granulometry, such as particles of oil coke or particles of coal. The constitution of a suspension of biomass particles, optionally mixed with other particles in an oil cut, also forms an integral part of the present invention.

PRIOR ART

The skilled person is aware of thermolysis processes operating at temperatures of about 250° C. and residence times of the order of a few minutes with a view to preparing a lignocellulosic biomass type feed to be treated in fluidized bed or entrained bed processes, and in particular in an entrained bed gasification unit. Mild thermolysis, or torrefaction, modifies the structure of the biomass so that subsequent milling operations are easier, and also modifies the final form of the solid particles obtained, which is close to spherical.

One of the aims of the present invention is to define the values of certain parameters to allow optimum dimensioning of a torrefaction furnace adapted to biomass treatment.

The Assignee's patent FR-A-2 678 850 describes a pyrolysis furnace adapted to the treatment of domestic waste. The material entering such a furnace has a chemical composition and density which is quite different from that of the lignocellulosic material of the present invention. In fact, as can be seen in the comparative table below, domestic waste has an oxygen content which is substantially lower than that of vegetable waste and also an ash content of the order of 30% by weight, while vegetable waste does not contain ash.

| Composition and calorific value type of a wood and a sample of domestic waste | | |
|---|---|---|
| | Wood (dry) | Domestic waste (dry). |
| C (wt %) | 49.5 | 36.9 |
| H (wt %) | 6 | 5.3 |
| O (wt %) | 43 | 24.6 |
| N (wt %) | 0.5 | 0.9 |
| S (wt %) | >0.1 | 0.3 |
| Cl (wt %) | 0 | 1.6 |
| Ash (wt %) | 1 | 30.4 |
| Gross calorific value (MJ/kg) | 18 | 14.8 |

U.S. Pat. No. 4,787,917 describes a process for torrefaction of wood at a temperature in the range 250° C. to 280° C. to provide sticks with a length in the range 5 to 20 mm. The process of the present invention provides particles less than 200 microns in size which can constitute a suspension.

BRIEF DESCRIPTION OF THE FIGURE

FIG. 1 is a schematic flowsheet of a pre-treatment process in accordance with the invention which supports the detailed description below. The dotted lines correspond to optional elements.

BRIEF DESCRIPTION OF THE INVENTION

The present invention concerns a process for pre-treatment of a feed containing at least lignocellulosic material with a view to its subsequent treatment in a gasification unit.

The starting material is constituted by vegetable waste of the lignocellulosic type such as chips of various types of wood. Said starting material may be available as chips with a typical dimension in the range 0.5 cm to 2 cm and with a water content in the range 10% to 40% by weight.

The first step of the process of the invention is drying carried out at a temperature below 250° C., preferably below 200° C., to reach a water content of the biomass to be treated of about 10% by weight, and thereby limit the emission of VOCs in the vapour produced.

Next, pre-treatment consists of mild pyrolysis, hereinafter termed torrefaction, carried out in a torrefaction furnace which provides a lignocellulosic material with a modified structure, and which is then sent to a milling unit.

The torrefaction operation is accompanied by drying which produces a biomass with a water content in the range 2% to 4% by weight and which, due to modifications in the structure, becomes hydrophobic. This property is advantageous as it prevents any subsequent increase in the water content of the pre-treated biomass.

Further, the subsequent gasification operation may necessitate adding water (to limit the formation of soot) and it is thus preferable for that water to be supplied externally and not to derive from the biomass itself. Biomass is known to be more reactive if it has a low moisture content. Thus, it is particularly advantageous to introduce into the gasification unit a biomass with as low a water content as possible.

The biomass particles from the torrefaction step are then sent to a milling step which produces the desired granulometry for subsequent gasification. The milling step is considerably facilitated by the torrefaction step which can reduce the energy consumption by at least 60% compared with milling without prior torrefaction.

A few non-limiting examples of lignocellulosic biomass material are shown below:
   agricultural waste (straw, etc);
   forestry residues (products resulting from thinning of forests);
   forestry products;
   dedicated culture (short coppice rotation).

The process for pre-treatment of lignocellulosic biomass type material of the present invention assumes that the biomass is available in chips in the range 0.5 to 2 cm in size. An optional primary milling or shredding step may be necessary to reach said chip size.

The process for pre-treatment of the lignocellulosic biomass type material of the present invention thus comprises at least one of the following steps:
   b) a primary drying step carried out at a temperature of less than 250° C., or even less than 200° C.;
   c) a step for torrefaction of the material from step b), said torrefaction being carried out at a temperature in the range 250° C. to 320° C., preferably in the range 270° C. to 300° C., with a residence time in the range 10 to 40 minutes, preferably in the range 15 to 30 minutes;
   d) a step for milling the material from step c) to produce biomass particles with a diameter of less than 200 microns, preferably less than 100 microns;
   e) a step for constituting a suspension consisting of a suspension of biomass particles from the preceding milling step, optionally mixed with other solid hydrocarbon particles, in a liquid hydrocarbon cut, said suspension comprising between 30% and 80% by weight of solid particles, preferably 40% to 70%.

Said process may also comprise, before the primary drying step, a step for milling or shredding of said material into chips in the range 0.5 cm to 2 cm in size.

In the case of a suspension constituted by a mixture of particles of biomass and other particles such as particles of oil coke, any proportions of the various types of particles may be employed, however with at least 5% by weight of particles of biomass type in the mixture.

The hydrocarbon cut used for the suspension constitution step may be a vacuum residue cut or a cut from a catalytic cracking unit or even more generally a hydrocarbon cut which may be pumped under standard storage conditions. The hydrocarbon cut which constitutes said suspension may also be a mixture, in any proportions, of the various cuts cited. Preferably, it is a mixture of "heavy" cuts in that their initial boiling point is preferably more than 350° C.

The suspension so constituted may be used as a feed supplying an entrained bed gasification unit to produce a synthesis gas.

DETAILED DESCRIPTION OF THE INVENTION

In this part of the text, we provide a description of an implementation of the process of the invention with the help of FIG. 1. In this FIGURE, the optional elements are shown as dotted lines.

The lignocellulosic feed A (stream 1) undergoes an optional coarse milling step or shredding in the optional primary mill (B), which optionally brings the size of the biomass particles to values in the range 0.5 to 2 cm. At the outlet from said shredding step, the feed supplies the drying unit C (stream 2).

Drying unit C is intended to reduce the moisture content of the feed to obtain a water content in said feed of less than 20% by weight, preferably less than 10% by weight.

As an example, one of the most effective drying techniques for the envisaged type of feed is convective drying by direct exchange with a hot gas, said hot gas possibly being pre heated air or combustion fumes. In this technique, the drying unit C is supplied with the feed to be dried (stream 2) and hot gas (18) the temperature of which has to remain below 250° C. to avoid any risk of fire in the dryer. The dried feed stream (stream 3) is supplied to the torrefaction unit (D).

The gas stream used for the drying operation (18) is cooled during drying and becomes charged with water vapour (corresponding to the quantity of water eliminated from the biomass feed), and with some volatile organic compounds (VOC) and entrained inorganic compounds (EIC). This stream (19) is generally discharged into the atmosphere. In the case in which the stream (18) is constituted by hot air, the stream (19) may be sent as a combustive air to the combustion chamber (F).

In the torrefaction furnace (D), the feed is heated to a temperature in the range 250° C. to 320° C., the residence time in the furnace being in the range 10 to 40 minutes and preferably in the range 15 to 30 minutes.

The torrefaction furnace (D) is preferably a cylindrical rotary furnace heated by a double jacket in which the hot fumes move (stream 9). The rotary furnace will preferably have a length to diameter ratio of less than 10, more preferably a length to diameter ratio in the range 3 to 8.

The flow pattern of the biomass inside the rotary furnace is preferably a rolling flow characterized by a flat surface for the layer of biomass, said surface having an angle of inclination with respect to the horizontal which is greater than or equal to the dynamic angle of repose. The angle of inclination of the biomass surface inside the torrefaction furnace is preferably at most 10 degrees greater than the dynamic angle of repose and more preferably at most 5 degrees greater than the dynamic angle of repose.

This characteristic generally corresponds to a rate of rotation of the furnace in the range 0.5 and 10 rpm, preferably in the range 1 to 5 rpm.

The dynamic angle of repose of a layer of granular solid is defined as the angle above which particles located in the upper portion of the layer of solid under consideration start to roll along the surface of said layer.

The torrefaction operation produces a stream of dry biomass (stream 4) the residual moisture content of which is of the order of 3% by weight, which is hydrophobic and readily ground.

The torrefaction step also generates a gas stream which derives from the biomass itself, which is extracted from the outlet of the furnace (stream 7), including water, carbon dioxide, carbon monoxide and a large variety of organic oxygen-containing compounds (such as methanol, formic acid, lactic acid, furfural, hydroxyl acetone).

The gas stream (7) is burned in a combustion chamber (F) using a stream of air as the fuel (stream 8). The hot fumes (stream 9) from the combustion chamber (F) enter the double jacket of the torrefaction furnace (D) to provide the necessary thermal energy for the furnace. At the outlet from the double jacket, cooled fumes are discharged to the atmosphere (stream 10).

The roasted biomass (stream 4) is then milled in a final mill (E) which can provide, for a low energy cost, a biomass feed in the form of particles of less than 200 microns, preferably less than 100 microns (stream 5), allowing the constitution of a suspension adapted to constitute the feed of an entrained bed gasification unit (not shown in FIG. 1).

Constituting a suspension (17) consists of obtaining a homogeneous mixture of particles of biomass (stream 5) in suspension in a vacuum residue (VR) type liquid hydrocarbon cut pumped from a storage facility A' (stream 6).

The roasted and milled biomass (stream 5) is conveyed from the mill (E) into the suspension preparation zone via a pneumatic transport system along with nitrogen (stream 12).

The suspension preparation system is constituted by 3 stirred tanks (B1*a*, B1*b* and B1*c*) in parallel each provided with a re-circulation pump (P1*a*, P1*b* and P1*c*).

Stream 5 and stream 6 are initially coarsely mixed to constitute the stream 11. Said stream (11) is then sent to one of the three tanks, for example B1*a*, valve V1*a* being open and V2*a* being closed. At the same time, one of the tanks is isolated, for example B1*b*, by means of valves V1*b* and V2*b* which are closed.

Pump P1*b* in operation can homogenize the solid and liquid contained in the tank B1*b*. Good homogeneity of the feed is vital during its injection into the burners of the gasification unit. To this end, pump P1*b* preferably functions at a rate allowing circulation of at least 3 times and more preferably at least about 5 times the volume of drum B1*b* per hour.

Finally, at the same time, drum B1*c* supplies the gasification unit via a pump P2, pump P1*c* still operating, and valve V1*c* being closed and V2*c* being open.

This system thus permanently allows a first drum to be in fill mode, a second drum to be in homogenization mode and a third drum to be in gasification unit supply mode. When the supply mode drum is empty, it is replaced by the drum which was in homogenization mode in the preceding period, which in turn is replaced by the drum which was in charging mode. The empty supply mode drum is then in the charging mode.

Finally, it should be noted that the drums are provided with a degassing facility to allow the nitrogen for transporting the solid to be eliminated (stream 13).

In addition to biomass, the suspension may optionally also include other types of particles such as particles of oil coke or coal particles. We shall refer to particles of oil coke as an example.

The stream of particles of oil coke (stream 20) is withdrawn from its storage facility (A") and then mixed with the stream of biomass particles just before being transported by nitrogen.

The remainder of the FIGURE is identical to the scheme using only particles of biomass as the solid.

The suspension so constituted, either uniquely from particles of biomass or mixed with other solid particles such as particles of coke or even coal, has an overall solid particles content which represents 30% to 70% by weight.

The preceding examples can be repeated with similar success by substituting the generically or specifically described reactants and/or operating conditions of this invention for those used in the preceding examples.

The entire disclosures of all applications, patents and publications, cited herein and of corresponding French application No. 06/07049, filed Jul. 31, 2006 are incorporated by reference herein.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process for pre-treatment of wood chip material, comprising at least the following steps:
   b) a primary drying step of said wood chip material carried out at a temperature of less than 250° C.;
   c) a step of torrefaction of the material from step b), said torrefaction being carried out at a temperature in the range of 250° C. to 320° C., with a residence time in the range 10 to 40 minutes;
   d) a step of milling the material from step c) to produce biomass particles with a diameter of less than 200 microns;
   e) a step of constituting a suspension of biomass particles from the milling step and optionally other solid hydrocarbon particles, in a liquid hydrocarbon cut having an initial boiling point above 350° C. and consists of a vacuum residue cut or a cut derived from a catalytic cracking unit or any mixture of said cuts, said suspension comprising 30% to 80% by weight of solid particles.

2. A pre-treatment process according to claim 1, further comprising, before the primary drying step, a step a) of milling or shredding said material into chips in the range of 0.5 cm to 2 cm in size.

3. A pre-treatment process according to claim 1, in which the torrefaction step is carried out at a temperature in the range 270° C. to 300° C. with a residence time in the range of 15 to 30 minutes.

4. A pre-treatment process according to claim 1, in which the torrefaction step is carried out in a rotary furnace with a length to diameter ratio of less than 10.

5. A pre-treatment process according to claim 1, in which the milling step delivers biomass particles with a diameter of less than 100 microns.

6. A pre-treatment process according to claim 1, in which the torrefaction step is carried out in a rotary furnace the rotation rate of which is in the range of 0.5 rpm to 10 rpm.

7. A pre-treatment process according to claim 1, in which the suspension comprises 40% to 70% by weight of solid particles.

8. A pre-treatment process according to claim 1, in which the suspension is constituted both by particles of biomass and particles of oil coke in any proportions with at least 5% by weight of particles of biomass in the mixture.

9. A pre-treatment process according to claim 1, in which the suspension constitution step is carried out in 3 interchangeable storage tanks functioning in turns, the first in charging mode, the second in homogenization mode, and the third in gasification unit supply mode.

10. A pre-treatment process according to claim 9, further comprising feeding the resultant homogenized suspension to an entrained bed gasification unit for the production of synthesis gas.

11. A process according to claim 4, wherein the length to diameter ratio is in the range of 3 to 8.

12. A process according to claim 6, wherein the length to diameter ratio of the rotary furnace is 3 to 8, and the rotation rate is 1 to 5 rpm.

13. A process according to claim 9, wherein the suspension in the homogenization mode is circulated at a rate of at 3 times per hour.

14. A process according to claim 9, wherein the suspension in the homogenization mode is circulated at a rate of at 5 times per hour.

15. A pre-treatment process according to claim 4, in which the torrefaction step is carried out in a rotary furnace the rotation rate of which is in the range of 0.5 rpm to 10 rpm.

16. A process according to claim 15, wherein the length to diameter ratio is in the range of 3 to 8.

* * * * *